(12) United States Patent
Blalock

(10) Patent No.: US 6,786,526 B1
(45) Date of Patent: Sep. 7, 2004

(54) WINDSHIELD FOR ALL-TERRAIN VEHICLE

(76) Inventor: Larry Blalock, 11128 Hwy. 160, Shongaloo, LA (US) 71072

( * ) Notice: Subject to any disclaimer, the term of this patent is extended or adjusted under 35 U.S.C. 154(b) by 0 days.

(21) Appl. No.: 10/408,049

(22) Filed: Apr. 5, 2003

(51) Int. Cl.$^7$ .................................................. B60P 1/64
(52) U.S. Cl. ..................................................... 296/77.1
(58) Field of Search ............................... 296/77.1, 78.1, 296/84.1, 96.21

(56) References Cited

U.S. PATENT DOCUMENTS

| | | | | |
|---|---|---|---|---|
| 756,021 A | * | 3/1904 | Hull ........................... | 296/77.1 |
| 2,396,493 A | * | 3/1946 | Comiskey, Sr. ............ | 296/78.1 |
| 2,589,993 A | * | 3/1952 | Comiskey, Sr. ............ | 296/78.1 |
| 2,903,297 A | * | 9/1959 | Zbikowski .................. | 296/78.1 |
| 3,369,836 A | * | 2/1968 | Haycock et al. ........... | 296/78.1 |
| 4,950,017 A | * | 8/1990 | Norton ....................... | 296/77.1 |
| 5,174,622 A | * | 12/1992 | Gutta ......................... | 296/77.1 |
| 5,203,601 A | * | 4/1993 | Guillot ....................... | 296/77.1 |
| 5,509,717 A | * | 4/1996 | Martin ....................... | 296/77.1 |
| 5,961,175 A | * | 10/1999 | Clardy, Jr. ................. | 296/102 |
| 6,206,446 B1 | * | 3/2001 | Slayden ..................... | 296/77.1 |
| 6,402,220 B2 | * | 6/2002 | Allen ......................... | 296/77.1 |
| 6,416,108 B1 | * | 7/2002 | Elswick ..................... | 296/96.21 |
| 6,530,617 B2 | * | 3/2003 | McElwee et al. .......... | 296/77.1 |
| 6,543,830 B1 | * | 4/2003 | Stuck ......................... | 296/77.1 |
| 6,565,139 B2 | * | 5/2003 | Bayerle et al. ............ | 296/77.1 |
| 2002/0074820 A1 | * | 6/2002 | Gagne ........................ | 296/92 |
| 2003/0230607 A1 | * | 12/2003 | Tweet et al. ............... | 224/401 |

* cited by examiner

*Primary Examiner*—D. Glenn Dayoan
*Assistant Examiner*—Paul Chenevert
(74) *Attorney, Agent, or Firm*—R. Keith Harrison

(57) ABSTRACT

A windshield which may be removably attached to an all-terrain vehicle to shield a rider on the ATV from wind. The windshield includes a base portion having notches for receiving various frame elements on the front frame of the ATV and a windshield panel extending upwardly from the base portion.

17 Claims, 3 Drawing Sheets

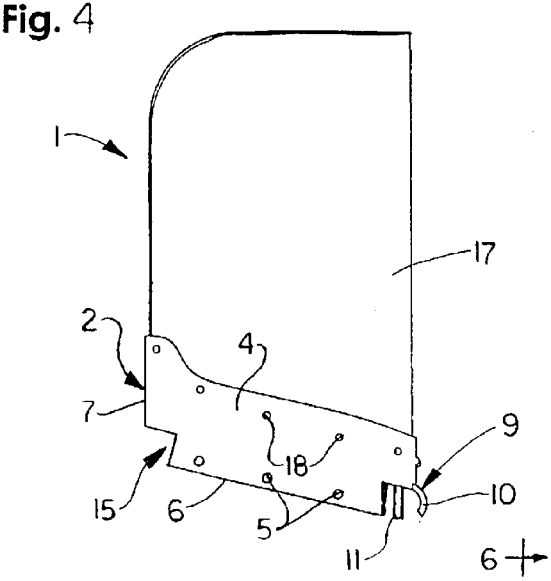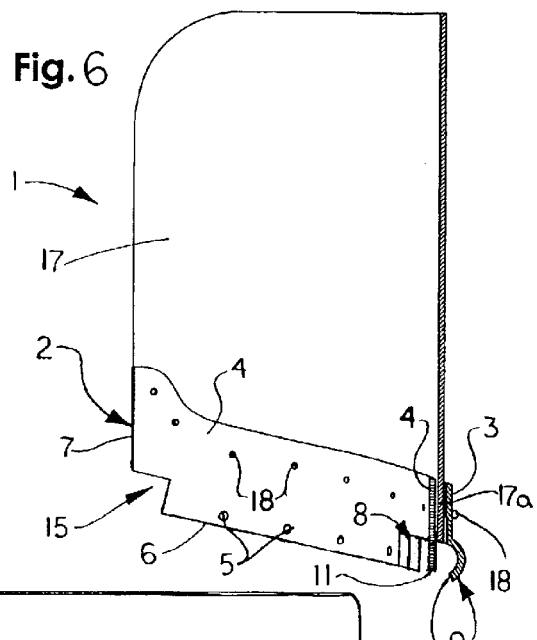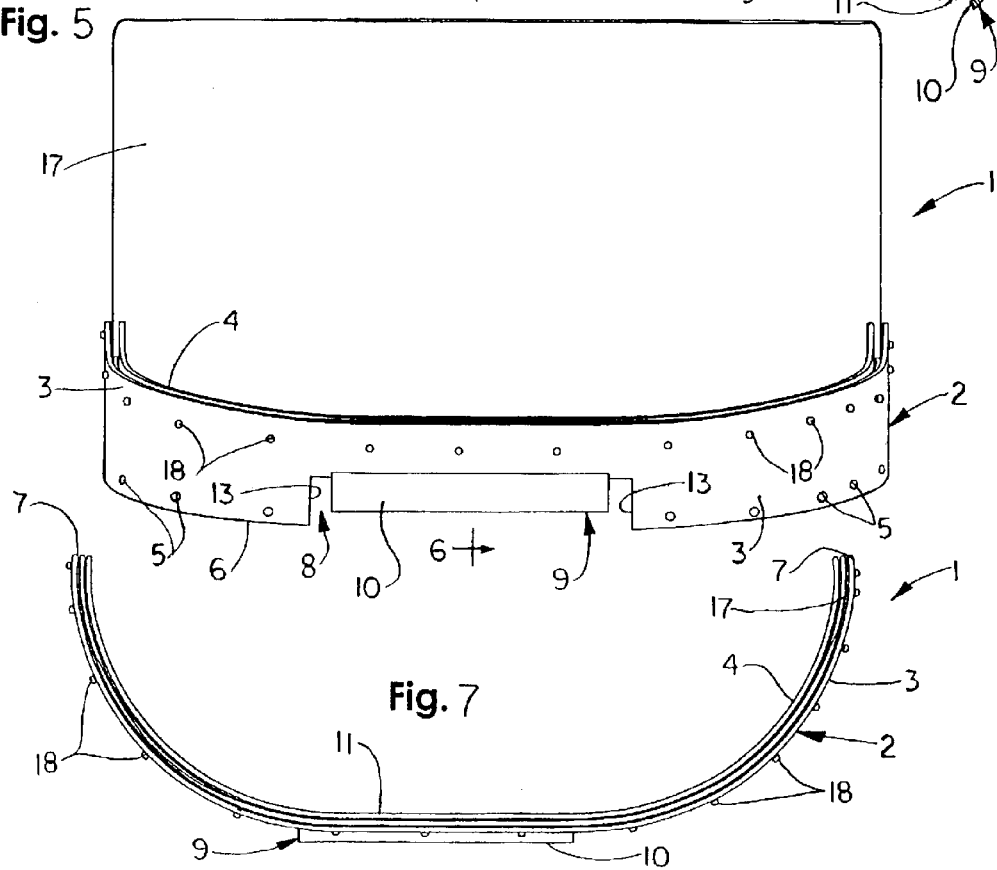

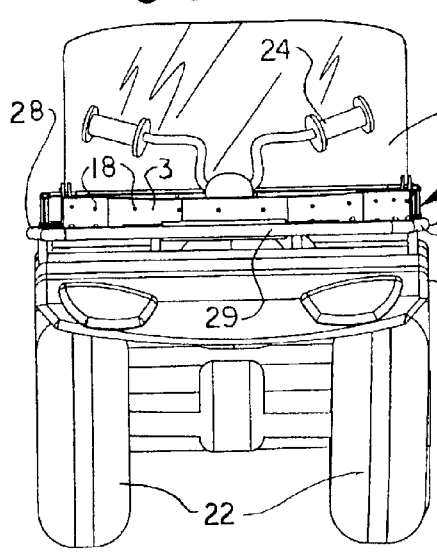
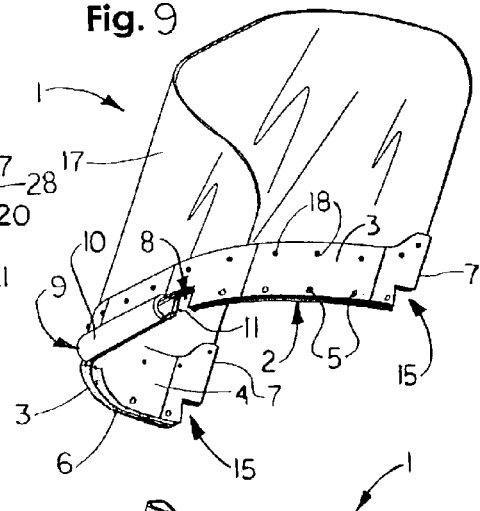
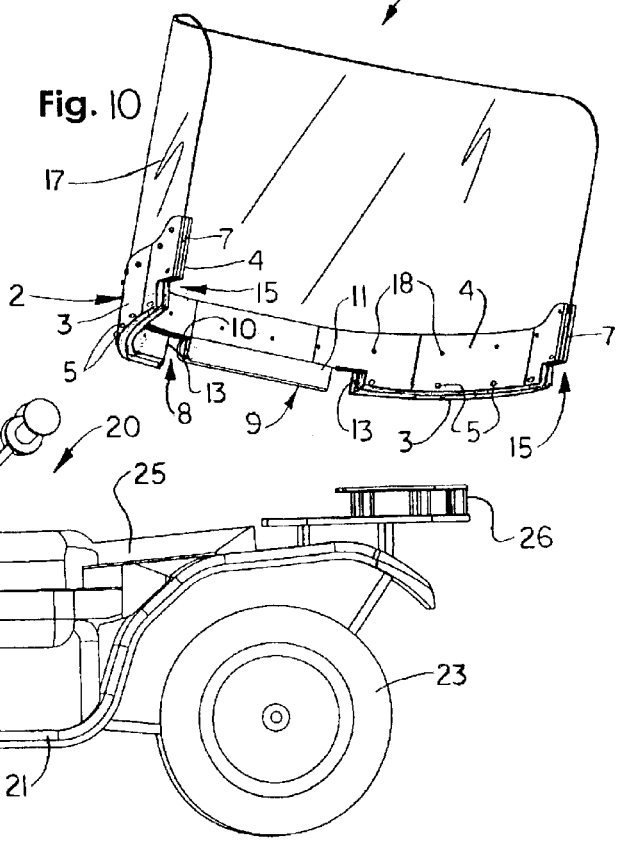
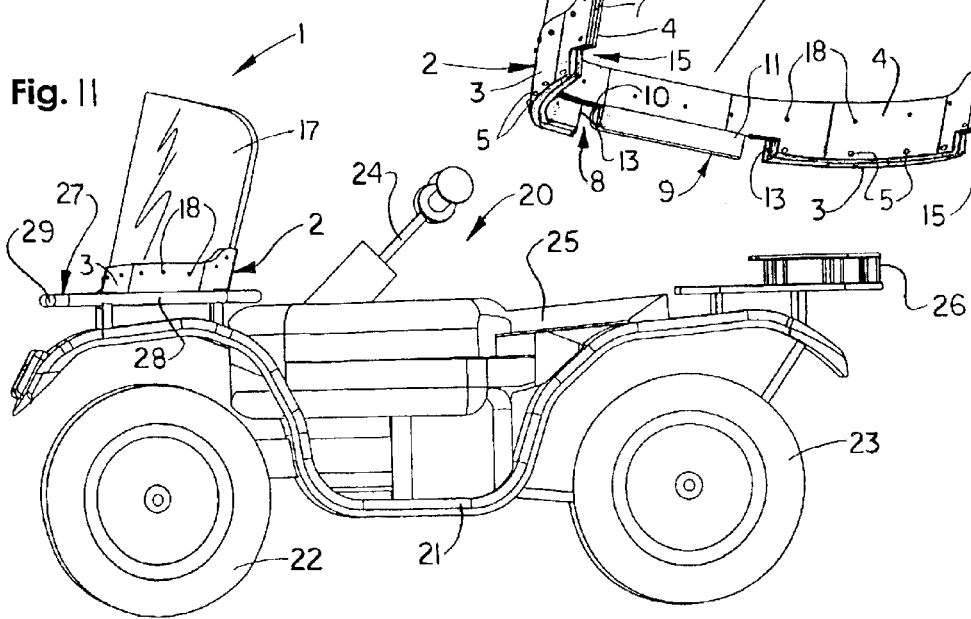

WINDSHIELD FOR ALL-TERRAIN VEHICLE

FIELD OF THE INVENTION

The present invention relates to accessories for all-terrain vehicles (ATVs). More particularly, the present invention relates to a windshield which may be removably fitted on the front rack of an all-terrain vehicle.

BACKGROUND OF THE INVENTION

In recent years, all-terrain vehicles (ATVs), particularly four-wheelers, have exploded in popularity. ATVs are particularly well-suited to traversing rough, off-the-road terrain. Outdoor sports enthusiasts such as hunters frequently use ATVs for transportation from a base camp to remote hunting sites, and also, to transport game carcasses from the hunting sites for dressing at another site, for example. In addition, ATVs may be used by police or firefighter personnel to reach buildings, houses or cabins in rural areas which are considered inaccessible by conventional vehicles.

Most four-wheeled ATVs include a frame or chassis having handlebars for steering the front wheels, in addition to front and rear racks to facilitate the attachment of camping equipment or hunting equipment such as a deerstand on the ATV, or for securing a game carcass onto the ATV. During operation of the ATV, the ATV rider is directly exposed to rushing wind since the ATV is typically not equipped with a windshield or other enclosure which would otherwise serve to block the wind. While this may be invigorating in cool or warm weather, cold weather conditions present a difficult and uncomfortable riding experience to the unshielded driver.

Various shields or enclosures are known in the art for mounting on an ATV in order to eliminate or reduce the wind load on an ATV rider. One type of windshield mounts on the handlebars of the ATV. Other types of ATV shields and enclosures are disclosed in U.S. Pat. Nos. 4,950,017; 5,174,622; 5,203,601; 5,961,175; 6,206,446; 6,402,220; and 6,416,108.

SUMMARY OF THE INVENTION

The present invention is generally directed to a windshield which may be removably attached to an all-terrain vehicle to shield a rider on the ATV from wind. The windshield includes a base portion having notches for receiving various frame elements on the front frame of the ATV and a windshield panel extending upwardly from the base portion.

BRIEF DESCRIPTION OF THE DRAWINGS

The invention will now be described, by way of example, with reference to the accompanying drawings, in which:

FIG. 4 is a right side view of the ATV windshield, removed from the ATV;

FIG. 5 is a front view of the ATV windshield;

FIG. 6 is a cross-sectional view, taken along section lines 6—6 in FIG. 5;

FIG. 7 is a top view of the ATV windshield;

FIG. 8 is a front view of an ATV, with the ATV windshield mounted on the front rack of the ATV;

FIG. 9 is a bottom perspective view of the ATV windshield, removed from the ATV;

FIG. 10 is a rear perspective view of the ATV windshield; and

FIG. 11 is a side view of an ATV, with the ATV windshield mounted on the front rack of the ATV.

DESCRIPTION OF THE PREFERRED EMBODIMENTS

Figure 1:
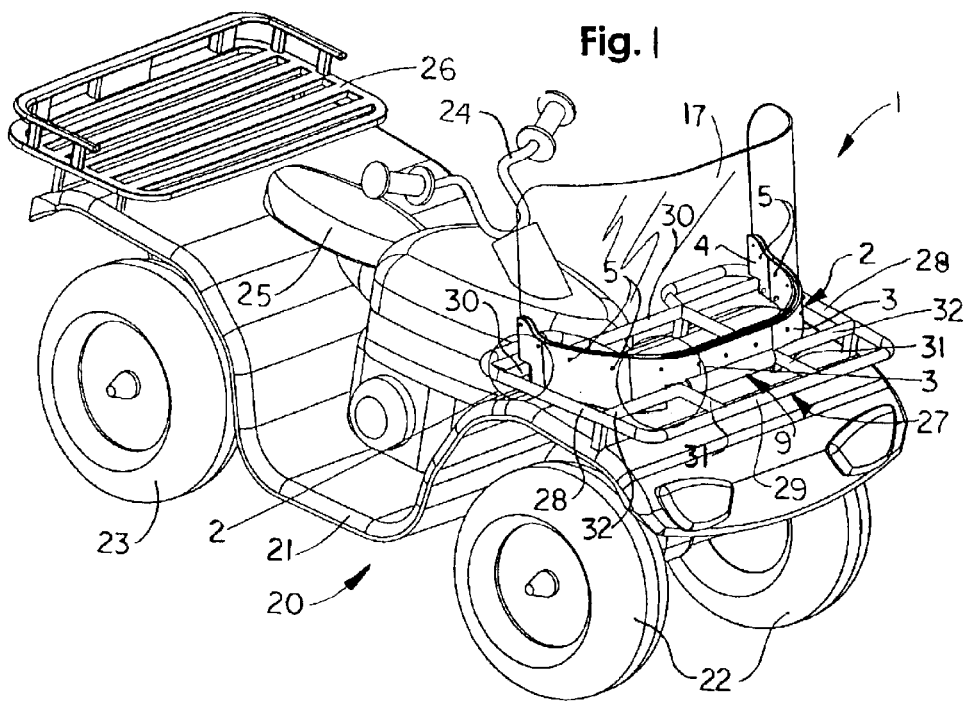
FIG. 1 is a front perspective view of a four-wheeled all-terrain vehicle, with an illustrative embodiment of the ATV windshield of the present invention mounted on a front rack of the ATV.
Figure 2:
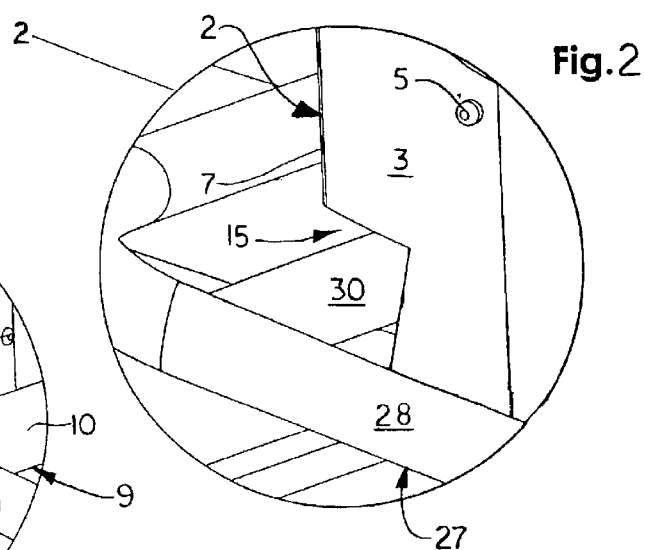
FIG. 2 is an enlarged view, taken along section line 2 in FIG. 1.
Figure 3:
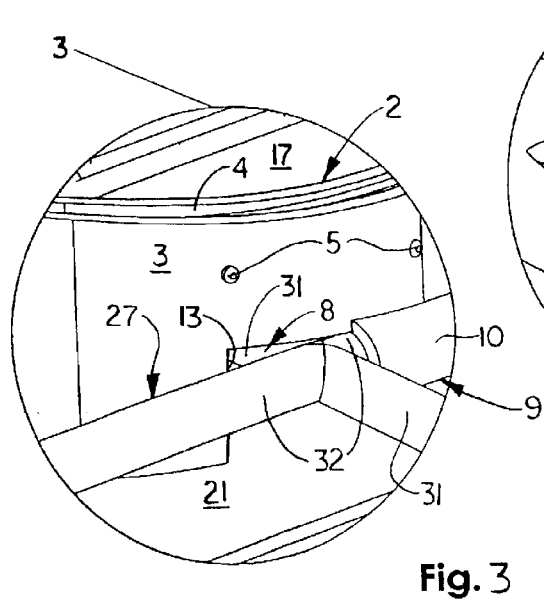
FIG. 3 is an enlarged view, taken along section line 3 in FIG. 1.

Referring initially to FIGS. 4–7, 9 and 10 of the drawings, an illustrative embodiment of the ATV windshield of the present invention is generally indicated by reference numeral 1. The ATV windshield 1 includes a base portion 2, typically having a front base panel 3 and an adjacent rear base panel 4 attached to each other typically using multiple, spaced-apart panel fasteners 5. Each of the panel fasteners 5 may be a rivet, for example, and extends through registering fastener openings (not shown) provided in the front base panel 3 and the rear base panel 4, respectively. It is understood that the front base panel 3 and the rear base panel 4 may be secured to each other using alternative techniques known by those skilled in the art, or alternatively, molded together in one piece. When the ATV windshield 1 is viewed from above, as shown in FIG. 7, the base portion 2 has an elongated, generally actuate configuration. Typically, the front base panel 3 and the rear base panel 4 are ABS plastic, although alternative materials of construction known by those skilled in the art may be used.

As shown in FIG. 5, an elongated front base notch 8 is provided in a bottom edge 6 of the base portion 2. The edges of the front base notch 8 are typically substantially equidistant from respective rear edges 7 (FIG. 4) of the base portion 2. As particularly shown in FIG. 6, an elongated clamp sleeve 9, which may have a generally C-shaped configuration in cross-section, extends from the base portion 2 at the front base notch 8. The clamp sleeve 9 typically includes a front sleeve segment 10 which extends from the front base panel 3 and a rear sleeve segment 11 which extends from the rear base panel 4. While one or both of the front sleeve segment 10 and the rear sleeve segment 11 may have a generally arcuate cross-sectional configuration, as shown in FIGS. 4 and 6 the rear sleeve segment 11 typically has a straight or non-arcuate configuration while the front sleeve segment 10 has an arcuate configuration, as shown. As shown in FIG. 5, a sleeve gap 13 is defined between each edge of the front base notch 8 and each corresponding end of the clamp sleeve 9. A pair of rear base notches 15 is provided in the base portion 2. Each rear base notch 15 is provided at the junction of the bottom edge 6 with the rear edge 7 of the base portion 2.

A generally curved, rectangular windshield panel 17 extends upwardly from between the front base panel 3 and the rear base panel 4 of the base portion 2. As shown in FIG. 6, the bottom edge portion 17a of the windshield panel 17 is typically secured between the front base panel 3 and the rear base panel 4 using windshield fasteners 18 such as rivets, each of which windshield fasteners 18 extends through registering openings (not shown) provided in the front base panel 3, the windshield panel 17 and the rear base panel 4, respectively. The windshield panel 17 may be a transparent plastic such as LEXAN (trademark), although alternative transparent plastics known by those skilled in the art may be used instead. As shown in FIG. 7, when viewed from above the windshield panel 17 has a generally elongated, arcuate configuration which substantially matches that of the base portion 2.

Referring next to FIGS. 1–3, 8 and 11 of the drawings, the ATV windshield 1 is adapted to be removably mounted on an ATV 20 such as a four-wheeler, as hereinafter described. The ATV 20 may be conventional and typically includes a frame or chassis 21 having a pair of rear wheels 23 and a pair of front wheels 22i which front wheels 22 are steered by handle bars 24 mounted on the chassis 21 in front of a seat 25 for seating a rider or riders. A rear rack 26 is typically provided on the chassis 21 behind the seat 25, and a front rack 27 is typically mounted on the chassis 21 in front of the handle bars 24 and above the front wheels 22, to facilitate the tying of hunting equipment, camping equipment, game carcasses or the like to the ATV 20.

As shown in FIG. 1, the front rack 27 of the conventional ATV 20 is typically generally rectangular in shape and includes a pair of spaced-apart, generally parallel side frame members 28 which are joined by a front frame member 29 and a parallel rear frame member 30. A pair of spaced-apart, parallel middle frame members 31 extends between the front frame member 29 and the rear frame member 30, between and in parallel relationship to the side frame members 28. A transverse frame member 32 extends between the side frame members 28, in intersecting and perpendicular relationship to the middle frame members 31.

The ATV windshield 1 is removably mounted on the front rack 27 as follows. As shown in FIG. 1 and detailed in FIG. 3, the clamp sleeve 9 receives the segment of the transverse frame member 32 which extends between the middle frame members 31, with the front sleeve segment 10 and the rear sleeve segment 11 (FIG. 6) engaging opposite sides of the transverse frame member 32 of the front rack 27. As further detailed in FIG. 3, each sleeve gap 13 defined between the corresponding end of the clamp sleeve 9 and adjacent edge of the front base notch 8 receives the segment of the corresponding middle frame member 31 that extends rearwardly from the transverse frame member 32. As shown in FIG. 1 and detailed in FIG. 2, each rear base notch 15 receives the rear frame member 30. Accordingly, when the ATV windshield 1 is so mounted on the front rack 27, the flexible base portion 2 is slightly constrained by and bowed between the side frame members 28 and the transverse frame member 32. This secures the ATV windshield 1 in place and prevents the ATV windshield 1 from inadvertently snapping out of place on the front rack 27. It will be appreciated by those skilled in the art that the windshield panel 17 of the ATV windshield 1 covers substantially the entire area corresponding to the width of the front rack 27 in front of the handlebars 24, and this substantially shields a driver (not shown) from wind load directed against the front surface of the windshield panel 17 as he or she sits on the seat 25 and rides the ATV 20. The ATV windshield 1 is removed from the front rack 27, as desired, simply by disengaging the clamp sleeve 9 from the transverse frame member 32; disengaging the front base notch 8 from the parallel middle frame members 31; and disengaging the rear base notches 15 from the rear frame member 30.

Referring again to FIGS. 1–3, it is understood that the exact spacings between the parallel middle frame members 31, between the front frame member 29 and the transverse frame member 32, between the transverse frame member 32 and the rear frame member 30, and between each side frame member 28 and the middle frame members 31 of the front rack 27 varies by manufacturer. Accordingly, the clamp sleeve 9, the front base notch 8, and the rear base notches 15 may be sized according to those dimensions depending on the particular manufacturer of the ATV 20.

While the preferred embodiments of the invention have been described above, it will be recognized and understood that various modifications can be made in the invention and the appended claims are intended to cover all such modifications which may fall within the spirit and scope of the invention.

What is claimed is:

1. A windshield for an all-terrain vehicle having a front rack, comprising:
    a base portion having a front base notch;
    a clamp sleeve carried by said base portion at said front base notch for receiving a transverse frame member on the front rack;
    a pair of sleeve gaps defined between said clamp sleeve and said base portion at said front base notch for receiving frame elements on the front rack;
    a pair of rear base notches provided in said base portion for receiving a rear frame member on the front rack; and
    a windshield panel carried by said base portion.

2. The windshield of claim 1 wherein said base portion comprises a generally arcuate front base panel and a generally arcuate rear base panel carried by said front base panel.

3. The windshield of claim 2 wherein said clamp sleeve comprises a front sleeve segment carried by said front base panel and a rear sleeve segment carried by said rear base panel.

4. The windshield of claim 3 wherein said front sleeve segment has a generally arcuate cross-sectional configuration.

5. A windshield for an all-terrain vehicle having a front rack, comprising:
    a base portion having an elongated front base notch for receiving frame elements on the front rack;
    a pair of rear base notches provided in said base portion for receiving a rear frame member on the front rack; and
    a windshield panel carried by said base portion; and
    an elongated clamp sleeve carried by said base portion in said front base notch for receiving a frame element on the front rack;

6. A windshield for an all-terrain vehicle having a front rack, comprising:
    a base portion having a front base notch for receiving frame elements on the front rack;
    a pair of rear base notches provided in said base portion for receiving a rear frame member on the front rack;
    a windshield panel carried be said base portion; and
    wherein said base portion comprises a generally arcuate front base panel and a generally arcuate rear base panel carried by said front base panel.

7. The windshield of claim 6 further comprising a clamp sleeve carried by said base portion for receiving a frame element on the front rack.

8. The windshield of claim 7 wherein said clamp sleeve comprises a front sleeve segment carried by said front base panel and a rear sleeve segment carried by said rear base panel.

9. A windshield for an all-terrain vehicle having a front rack, comprising:
    a base portion having a plurality of notches for receiving frame elements on the front rack;

a windshield panel carried by said base portion; and wherein said base portion comprises a generally arcuate front base panel and a generally arcuate rear base panel carried by said front base panel.

10. A windshield for an all-terrain vehicle having a front rack, comprising:

a base portion having a plurality of notches for receiving frame elements on the front rack;

a windshield panel carried by said base portion; and a clamp sleeve carried by said base portion in one of said plurality of notches for receiving a frame element on the front rack.

11. The windshield of claim 10 wherein said base portion is ABS plastic.

12. The windshield of claim 11 wherein said base portion comprises a generally arcuate front base panel and a generally arcuate rear base panel carried by said front base panel.

13. The windshield of claim 10 wherein said base portion comprises a generally arcuate front base panel and a generally arcuate rear base panel carried by said front base panel.

14. The windshield of claim 13 wherein said clamp sleeve comprises a front sleeve segment carried by said front base panel and a rear sleeve segment carried by said rear base panel.

15. The windshield of claim 14 wherein said base portion is ABS plastic.

16. The windshield of claim 14 wherein said front sleeve segment has a generally arcuate cross-sectional configuration.

17. The windshield of claim 16 wherein said base portion is ABS plastic.

* * * * *